United States Patent [19]

Hsia

[11] Patent Number: 4,670,196
[45] Date of Patent: Jun. 2, 1987

[54] TOWER PACKING ELEMENT

[75] Inventor: Min A. Hsia, Kent, Ohio

[73] Assignee: Norton Company, Worcester, Mass.

[21] Appl. No.: 775,919

[22] Filed: Sep. 13, 1985

Related U.S. Application Data

[63] Continuation of Ser. No. 772,843, Sep. 5, 1985, abandoned.

[51] Int. Cl.$^4$ ................................................ B01F 3/04
[52] U.S. Cl. ............................. 261/112; 261/DIG. 72
[58] Field of Search .......................... 261/112, DIG. 72

[56] References Cited

U.S. PATENT DOCUMENTS

| | | | |
|---|---|---|---|
| 3,415,502 | 12/1968 | Munters | 261/112 |
| 3,469,626 | 9/1969 | Wright et al. | 261/112 |
| 3,599,943 | 8/1971 | Munters | 261/95 |
| 3,618,778 | 11/1971 | Benton et al. | 261/112 |
| 3,785,620 | 1/1974 | Huber | 261/112 |
| 3,801,419 | 4/1974 | Meek | 428/182 |
| 3,887,664 | 6/1975 | Regehr | 261/112 |
| 3,952,077 | 4/1976 | Wigley | 261/112 |
| 4,052,491 | 10/1977 | Lefevre | 261/112 |
| 4,107,241 | 8/1978 | Braun | 261/112 |
| 4,186,159 | 1/1980 | Huber | 261/112 |
| 4,296,050 | 10/1981 | Meier | 261/112 |
| 4,337,217 | 6/1982 | Braun | 261/112 |
| 4,344,899 | 8/1982 | Monjoie | 261/112 |
| 4,562,015 | 12/1985 | Lefevre | 261/112 |

FOREIGN PATENT DOCUMENTS 2601890  7/1977  Fed. Rep. of Germany ...... 261/112

Primary Examiner—Tim Miles
Attorney, Agent, or Firm—Walter Fred

[57] ABSTRACT

An efficient low pressure drop packing element for exchange columns is made up of a plurality of preformed vertical sheets, each having a plurality of inclined rows of adjacent relatively short inclined troughs including valleys and ridges extending between upper inlet edges and lower outlet drip edges and projecting alternately outwardly from one side and then the opposite side of the median plane of each sheet. The sheets are arranged so that the inclined rows of the troughs in adjacent sheets are oppositely inclined and in crisscrossing relation to the inclined rows of the adjacent sheet of the packing element causing frequent changes in direction of liquid flow and whereby the both sides of each sheet are more easily and uniformly wetted by the frequently diverted liquid flowing downwardly over the surface thereof.

13 Claims, 6 Drawing Figures

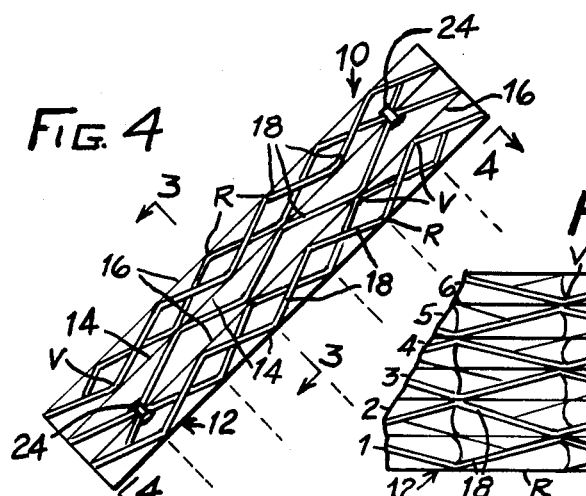
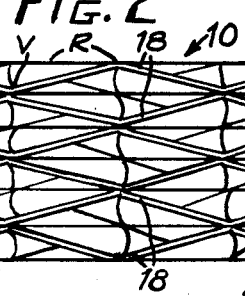
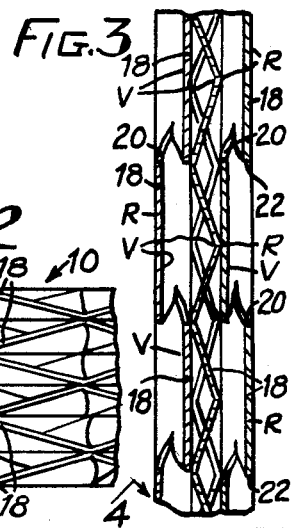
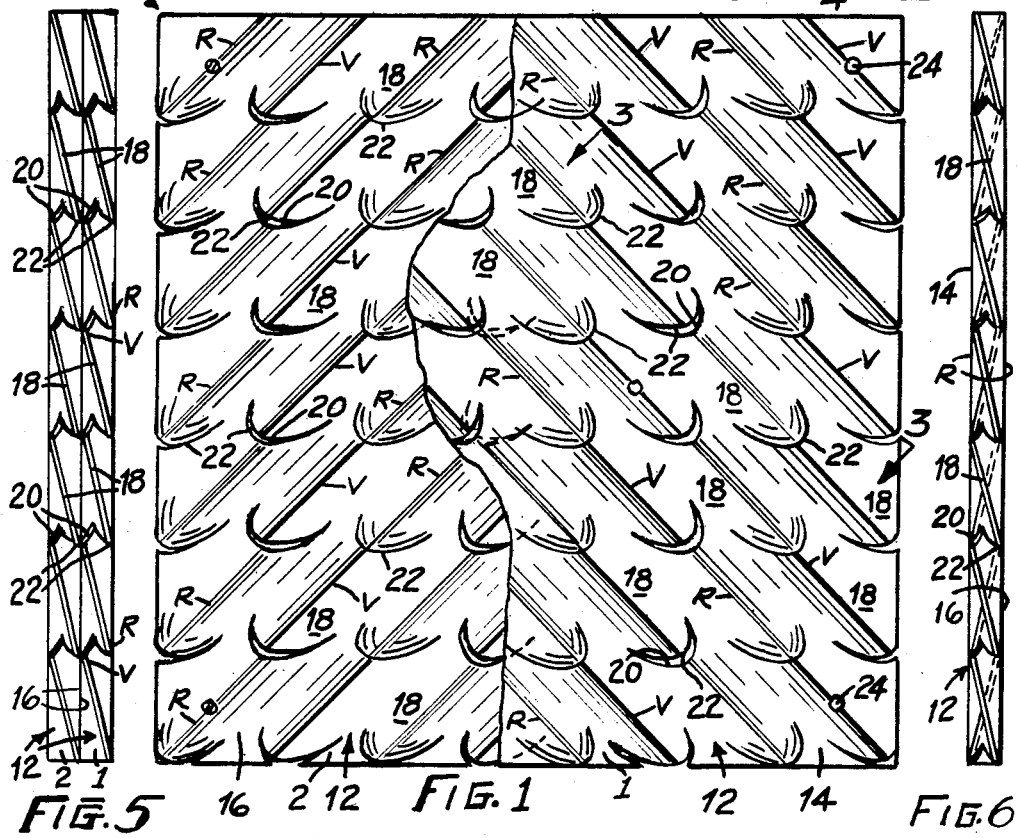

TOWER PACKING ELEMENT

REFERENCE TO RELATED APPLICATION

This application is a continuation of application Ser. No. 06/772,843, filed Sept. 5, 1985, now abandoned.

BACKGROUND OF THE INVENTION

1. Field of Invention

The invention relates to a packing element, comprised of a plurality of preformed perforated vertical sheets of high multidirected surface area, and drip points and low pressure drop for mass transfer columns, distillation, and liquid-gas contact apparatus.

2. Description of the Prior Art

Heretofore packing elements have been constructed of a number of corrugated sheets arranged so that the corrugation and channels of adjacent sheets are inclined, cross one another, and extend in opposite directions. In some instances the sheets are perforated and the surfaces textured, fluted, or roughened in various patterns to promote a more uniform distribution of the flow over the surfaces. Examples of such prior art packings are disclosed in U.S. Pat. Nos. 3,415,502; 3,599,943; 4,186,159, and 4,296,050. However, such prior art packing elements are not as efficient in energy conservation and/or mass transfer as the invention to be presented here.

The instant invention provides a packing element in which each sheet has a plurality of inclined parallel rows of V-shaped troughs adjoining one another and projecting alternately from one side and then the opposite side of the medium plane of the sheet. Each adjoining V-shape trough has an upper entrance edge and a lower outlet drip edge. Each sheet has, when viewed from one side, vertically aligned rows of the troughs with inclined ridges between vertically aligned rows of inclined valleys.

Thus, liquid flows over the inclined surfaces and drips from the lower drip edges on the ridges, and changes direction frequently when it lands upon the inclined both sides of the same and adjacent sheets.

SUMMARY OF THE INVENTION

A packing element comprises a predetermined number of layers of preformed sheets fastened or banded together. Each sheet has top and bottom edges, opposite sides and parallel inclined rows of adjoining relatively shorter elongated V-shape inclined troughs projecting alternately outwardly from one side and then from the opposite side of a mid plane of the sheet. Hence, each of the inclined rows in the sheet provides a series of elongated inclined ridges or peaks spaced by an intervening elongated inclined bottom of a valley on each side of the sheet. Each adjoining V-shape inclined trough has an upper entrance or inlet adjacent its upper edge and an outlet at its lower drip edge. The lowest point of each lower drip edge and each upper edge of the inclined v-shape portion in each of the rows are substantially on the same horizontal and vertical planes. As a result, the V-shape inclined troughs are also aligned in a number of adjacent horizontal rows across the sheet such that the elongated inclined ridges in each of the horizontal rows are aligned vertically and situated between elongated inclined valleys also aligned in vertical rows between the vertical rows of ridges.

A packing element of predetermined thickness is constructed of a number of identical sheets arranged so that the odd numbered (1, 3, 5, 7, etc.) sheets have the parallel rows inclined in the same direction and spaced by the even numbered (2, 4, 6, 8, etc.) sheets, rotated such that the parallel rows are inclined in the same opposite direction and cross the inclined rows of the adjacent odd numbered sheets. Thus, the direction of the liquid flow on the inclined surfaces of either the valleys or ridges changes frequently and is uniformly distributed by the drip edges in various directions over the same sheet and over surfaces of the adjacent sheet during its free travel downwardly over both sides of the sheets.

BRIEF DESCRIPTION OF THE DRAWINGS

FIG. 1 is a front view of the assembled packing element with a portion of the first or odd numbered sheet broken away to show a portion of and arrangement of the second or even numbered sheet of the packing element;

FIG. 2 is a partial top view of the packing element of FIG. 1;

FIG. 3 is a sectional view through three layers of the packing element taken on line 3—3 of FIG. 1 and FIG. 4;

FIG. 4 is an angular top view of the inclined rows of troughs in three layers of the packing element of FIG. 1;

FIG. 5 is a left hand side view of the first and second layer and other adjacent pairs of layers of the packing element of FIG. 1, and;

FIG. 6 is a right hand side view of the first layer and every odd numbered layer of the packing element of FIG. 1.

DESCRIPTION OF THE PREFERRED EMBODIMENT

Referring to FIGS. 1 and 2, a typical packing element 10 is shown, made to predetermined desired thickness, height, and width or diameter, by coiling or assembling a number of layers of the identical preformed sheets 12 together in an alternating manner. Each preformed sheet or layer 12 has a front side 14 and an opposite back side 16. Projecting alternately along the rows from opposite front and back sides 14 and 16 are a plurality of elongated inclined V-shape troughs 18 of substantially identical size and shape. Each of the troughs 18 have outer inclined trickle surfaces converging to and defining an elongated inclined ridge R and inner inclined surfaces converging to the elongated floor or bottom of and defining an elongated inclined Valley V opposite the ridge R. Hence, each of the adjacent horizontal and inclined rows of elongated inclined V-shape troughs 18 has alternating inclined ridges and valleys on each of the sides 14 and 16 and median plane of the sheet, layer, or plate 12 of the packing element 10. The elongated inclined V-shape troughs 18 are provided with upper concave edges 20 about an entrance or inlet to the valleys V and longitudinally projecting lower convex drip edges 22 about lower outlet ends thereof. The upper edge 20 and the lower drip edges 22 of adjacent V-shape portions in the inclined rows are of substantially the same complimentary shape and depth. Each pair of adjacent upper and lower edges 20 and 22 extend from lower midpoints thereof and upwardly along both sides of the ridges and valleys to opposite upper ends that converge at junctions located between adjacent ridges and valleys and near the median plane of the sheet 12.

Alternatively, the cross-sectional shape of the inclined troughs 18 may be in the form of a circular segment with curved surfaces, curved valleys and ridges, or a combination of straight sides, diverging from a narrow flat or arcuate apex or ridge. Also the upper curved edges 20 and lower drip 22 maybe V-shaped or have serrated straight or curved edges.

It can also be seen that the elongated inclined V-shape troughs 18 are arranged on the sheet in adjacent vertical, horizontal and inclined rows and that the lowest point of the upper edges 20 and drip edges 22 lie on a single plane and at the intersection of the three horizontal, inclined and vertical planes.

The sheets 12 of V-packing element 10 are preferably preformed to identical size and shape and assembled so that every other sheet is turned from side to side 180° so the backside 16 of adjacent sheets are together back to back. Thus, the elongated moderately inclined V-shape troughs 18, ridges and valleys, are oppositely inclined and cross those of the adjacent sheet, while the upper edges 20 and lower drip edges 22 remain substantially at the same height and horizontal plane as those of the adjacent sheet or layer.

The assembled sheets 12 may be fastened together by either banding the entire assembly or, preferably, by fastening adjacent sheets together with conventional screws, bolts, or rivets 24 at several places where the oppositely inclined elongated ridges of adjacent sheets contact and cross one another at approximately a 90° angle.

As a result the adjacent sheets contact one another only at the crossing mid-points of the ridges R which now face each other and define the back sides 16 of the sheets and thereby provide horizontal rows of facing criss-crossing valleys V between the facing criss-crossing ridges R and alternating vertical rows of the facing criss-crossing ridges R and valleys V between adjacent sheets.

Typically, the inclined rows of the troughs 18 are inclined from 30° to 60° but preferrably 45° and spaced about 1" (2.54 cm) apart. The elongated troughs have a length of about 1¾" (4.44 cm) along the ridge between the upper and lower drip edges and a depth of about 0.394" (1 cm) between the ridge and valley of adjacent troughs 18.

The sheets may be molded of plastic material but are preferably made by conventionally die stamping out an initially thin flat sheet of a metal such as copper, stainless steel, or monel metal carbon steel, aluminum 0.010 to 0.050 (0.254 to 1.27 mm) thick with either smooth, fluted, dimpled or textured surfaces. Depending upon the thickness of each sheet 12 a typical packing element 10 will comprise anywhere from 10-40 sheets or layers 12 and a height and width which allows it to be inserted through the conventional 18"×18" manway in the column or tower wall.

In operation the liquid is distributed over and flows downwardly over both sides of each sheet of the packing 10 while the gas or exchange medium flows upwardly and makes contact and exchange with the liquid on the surfaces wetted by the liquid. The liquid flows over the inclined surface, ridges, and from the drip edges on both sides of the sheet, and is frequently caused to change direction onto surfaces of the same or adjacent sheets. Thus, the liquid flow is frequently diverted and more uniformly distributed on the surfaces of the sheet and has a surprisingly lower pressure drop.

It is obvious that the size, and shape of the sheets and troughs, angles of inclination of the rows of inclined troughs, and arrangement of the sheets and troughs relative to those of adjacent sheets of the packing element can be varied to suit different applications.

For example, the angle of inclination of the inclined rows may vary from those of adjacent sheets, may criss cross the inclined rows of adjacent sheets at angles other than 90°, the upper and lower drip edges of adjacent sheets can be located at different heights and in different planes. Also, the longitudinal length of the elongated inclined troughs, ridges and valley may be varied from sheet to sheet or in different horizontal rows and inclined rows of the same sheet.

A comparison was made between the packing of the invention and the state-of-the-art corrugated-sheet type packing with textured surface, which is commercially available at this time.

The test was conducted under the same conditions in a 15" (38.1 cm) diameter distillation tower packed to a depth of 10 ft. (3.048 m). A mixture of Isooctane and Toluene was fed into the packing at a pressure of 100 mm of mercury.

The results of the test indicate that the packing of the invention had a desired lower pressure drop per theoretical plate of 25% or better, and 25% greater maximum capacity than the state-of-the-art corrugated-sheet type packing with textured surface.

As many modifications of the packing element are possible, it is to be understood that the embodiment disclosed is merely an example thereof, and that the invention includes all modifications, embodiments and equivalents thereof falling within the scope of the appended claims.

I claim:

1. A packing element for an exchange column comprising:
    a plurality of preformed sheets situated adjacent one another,
    a plurality of inclined rows of elongated inclined troughs with alternating, elongated inclined valleys and elongated inclined ridges on opposite front and back sides of each preformed sheet and disposed at an angle opposite and in criss crossing relation to the inclined rows of the inclined troughs, alternating valleys and ridges of an adjacent sheet of the packing element, an upper edge extending about an inlet to each trough, and
    a lower drip edge extending about an outlet end of each trough and disposed adjacent the upper edge and inlet of an adjacent lower trough on the opposite side of the sheet and in the same inclined row.

2. A packing element according to claim 1 wherein each of the elongated inclined troughs have inclined converging surfaces with an elongated valley on one side and an elongated ridge on an opposite side of the trough extending longitudinally in a single inclined plane between the upper edge and the lower drip edge.

3. A packing element according to claim 1 wherein the upper edge and lower drip edge each have a low point from which they extend upwardly along the shape of the trough to high points on opposite sides of the inclined ridge.

4. A packing according to claim 3 wherein the upper edge and the lower drip edge are curved.

5. A packing element according to claim 1 wherein the inclined troughs are also arranged in a plurality of adjacent horizontal rows with valleys and ridges thereof alternating across each side of the sheet and with the lower drip edges of the inclined troughs in each horizontal row substantially aligned and lying in a single substantially horizontal plane.

6. A packing element according to claim 1 wherein the inclined troughs are also arranged in vertical rows on each side of the sheet and with the lower drip edges of each of the inclined troughs in each vertical row substantially aligned and lying in a single substantially vertical plane.

7. A packing element according to claim 1 wherein the inclined rows of elongated inclined troughs are generally parallel to one another and inclined at an angle of from 30 to 60 degrees from a horizontal plane.

8. A packing element according to claim 1 wherein the inclined ridges of the troughs in each of the inclined rows lie in substantially the same incline plane.

9. A packing element according to claim 1 wherein the troughs on both opposite sides of the sheet are of substantially identical size and shape and protrude outwardly substantially the same depth from a median plane of the sheet.

10. A packing element according to claim 1 further comprising:
fastening means for holding the sheets together.

11. A packing element according to claim 1 wherein the lower drip edge of one trough and the upper edge of an other adjacent trough in the same incline row extend inwardly from the ridges on opposite sides of the sheet, converge toward and join one another at high points located on opposite sides of the sheet and near a median plane of the sheet.

12. A packing element according to claim 3 wherein the low points of the lower drip edges on each of the inclined troughs in each inclined row of each sheet of the packing element is situated substantially at the intersection of inclined, horizontal and vertical planes.

13. A packing element according to claim 1 wherein each preformed sheet of the packing element is formed from sheet metal selected from a group consisting of copper, aluminum, stainless steel, carbon steel monel metal, and alloys thereof.

* * * * *